United States Patent [19]

Duffee

[11] Patent Number: 4,538,820
[45] Date of Patent: Sep. 3, 1985

[54] SHAFT SEAL

[76] Inventor: Henry S. Duffee, 1104 Wentworth Dr., Florence, S.C. 29501

[21] Appl. No.: 507,274

[22] Filed: Jun. 23, 1983

[51] Int. Cl.³ .............................................. F16J 15/34
[52] U.S. Cl. ................................... 277/11; 277/81 R
[58] Field of Search .................... 277/11, 81 R, 38–41

[56] References Cited

U.S. PATENT DOCUMENTS 3,042,414 7/1962 Tracy ..................................... 277/11
4,415,164 11/1983 Johnson ................................ 277/11

Primary Examiner—Robert I. Smith
Attorney, Agent, or Firm—Harvey B. Jacobson

[57] ABSTRACT

A seal assembly for sealing between a rotating shaft and a housing member is provided. The seal assembly includes a first annular seal member seated in the closed end of an annular axially opening recess rotatable with the rotating shaft and centered radially within the recess by resilient O-ring structure. A second stationary annular seal member is provided and is supported in a floating manner from the housing member or portion and axially shiftable relative to the housing member toward and away from the first annular seal member. The first and second annular seal members include opposing axial faces slidably and frictionally engaged with each other and spring structure is operatively connected between the housing member and the second annular seal member yieldingly biasing the second seal member toward the first seal member. The second floating seal member is radially centered by a resilient O-ring and the seal assembly is constructed whereby fluid pressure between the housing and the shaft will assist in yieldably biasing the second seal member toward the first seal member.

3 Claims, 3 Drawing Figures

SHAFT SEAL

BACKGROUND OF THE INVENTION

Various forms of seal assemblies heretofore have been used between stationary housing portions and shafts rotatable relative to the housing portions. These seal assemblies have included stationary annular seal members carried by the corresponding housing portions and which are free floating and spring and/or hydraulic pressure urged toward a companion rotating annular member. The companion rotating seal members heretofore have been either spring or hydraulic pressure urged toward a stationary mating face and in some instances have been fixed to the rotating housing by enclamping, fastening or other holding methods in an axial direction. However, these previously known forms of rotating seal members are subject to distortion in axial or diametrical directions and are thus difficult to construct with minimum runout.

Examples of previously known forms of seal assemblies including some of the general structural and operational features of the instant invention are disclosed in U.S. Pat. Nos. 3,020,052, 3,420,535, 3,765,689 and 3,972,536.

BRIEF DESCRIPTION OF THE INVENTION

The seal assembly of the instant invention utilizes a somewhat conventional floating mounting and spring biased stationary seal face defining seal member and a rotating seal member coaxially supported relative to an associated rotating shaft and supported therefrom for automatic centering by a tight fitting O-ring. The stationary seal member is supported from the associated housing portion for shifting toward and away from the rotating seal member and is spring biased toward engagement with the rotating seal member. In addition, the rotating seal member is constructed in a manner whereby ambient fluid pressure will assist the associated springs in yieldingly biasing the stationary seal member axially of the associated shaft toward engagement with the stationary seal member, the stationary seal member being backed by an axially facing circumferential seat and, as hereinbefore set forth, being yieldably centered relative to that seat in a radial direction by a tight fitting O-ring disposed between radially opposing surfaces of the rotating seal member and its supporting seat structure.

The main object of this invention is to provide a seal assembly for use between a stationary housing portion and a rotating shaft and which will be operative to establish an effective fluid tight seal over extending operating periods.

Yet another object of this invention is to provide a seal assembly wherein spring pressure as well as ambient fluid pressure may be used to yieldingly bias relatively rotatable seal faces of the seal assembly toward sealed engagement with each other.

Still another important object of this invention is to provide a seal assembly wherein the seal mating surfaces of the stationary and rotating components will be supported in a manner whereby micro-deformations as a result of mechanical forces will be substantially eliminated.

Still another object of this invention is to provide a seal assembly constructed in a manner so as to include a limited ability to align properly the rotary face under limited misalignment conditions.

A final object of this invention to be specifically enumerated herein is to provide a seal assembly which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
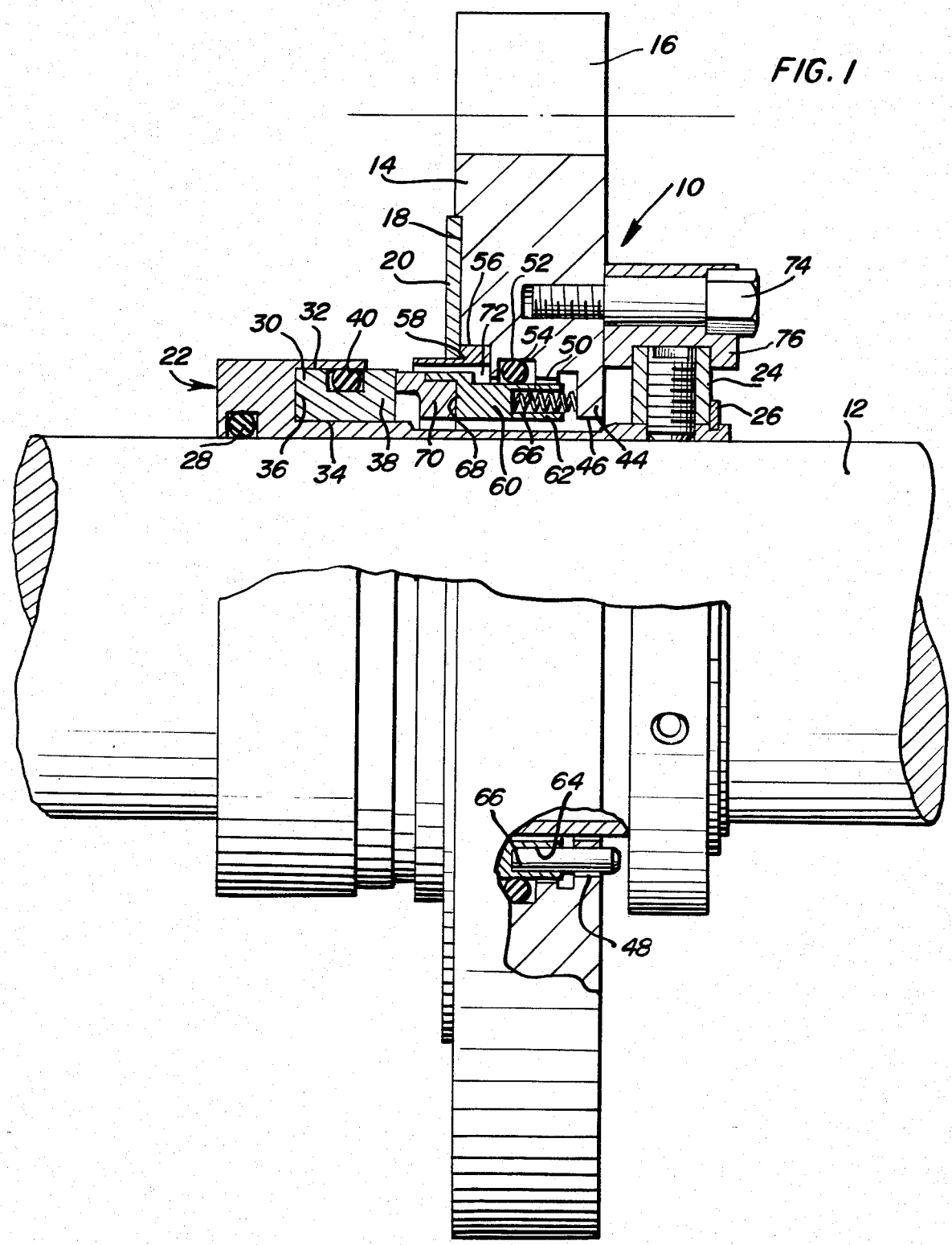
FIG. 1 is a vertical sectional view taken substantially upon a plane passing through the longitudinal center line of a first form of seal assembly constructed in accordance with the present invention.

Referring now more specifically to the drawings, the numeral 10 generally designates a first form of bearing assembly utilized in conjunction with a rotary shaft 12 and a stationary housing portion 14. The housing portion 14 comprises a gland including circumferentially spaced slots 16 through which cap screws or similar fastening means may be secured for mounting the gland 14 to an associated centrifugal pump housing (not shown). The gland 14 includes a gasket recess 18 formed in one side thereof and in which a flat sealing gasket 20 is disposed for forming a fluid tight seal between the gland 14 and the opposing pump housing.

The shaft 12 will be journalled from the associated pump housing by any suitable bearings (not shown) and the seal assembly of the instant invention includes a rotary sleeve housing referred to in general by the reference numeral 22 mounted on the shaft 12 and anchored to the latter by a set screw equipped drive collar 24 positioned relative to the sleeve housing 22 by a snap ring 26.

The sleeve housing 22 is sealed relative to the shaft 12 by an O-ring 28 and defines an annular axially opening cavity 30 including an outer inwardly facing cylindrical wall 32, an inner outwardly facing cylindrical wall 34 and an annular radial and circumferentially continuous inner end wall 36. An annular seal face member 38 is seated within the cavity 30 and equipped with a tight fitting O-ring 40 engaged with the wall 32.

The gland 14 includes an annular inner shoulder 44 which defines a central opening 46 in the gland 14 through which the shaft 12 and sleeve housing 22 are received and the shoulder 44 includes a plurality of circumferentially spaced bores 48 formed therethrough. In addition, the opening 46 includes a first diametrically enlarged portion 50 provided with an inwardly opening circumferentially extending groove 52 in which an O-ring 54 is disposed and a second diametrically enlarged portion 56 in which a gasket positioning and shield ring 58 is seated. An annular holder 60 is provided and projects through the first and second diametrically enlarged portions 50 and 56 of the opening 46 and the holder 60 is equipped with a plurality of circumferentially spaced blind axially extending recesses 62 and blind axially extending bores 64 spaced intermediate the recesses 62. Recesses 62 have one set of corresponding ends of compression springs 66 seated therein and the other set of corresponding ends of the compression springs 66 abut against the shoulder 44. The bores 64 have one set of corresponding ends of drive and positioning pins 66 pressed therein and the other set of corresponding ends of the pins 66 are loosely received through the bores 48. The O-ring 54 slidably and compressably engages the outer periphery of the holder 60 and the holder 60 defines an axially opening annular recess 68 on its end remote from the end thereof through which the recesses 62 and bores 64 open. A second annular seal face member 70 is seated and snugly received within the recess 68 and the opposing axial faces of the seal members 38 and 70 are rotatably frictionally engaged with each other. Further, the outer periphery of the holder 60 includes a relieved portion 72 against which fluid pressure may act inwardly of the O-ring 54 in order to assist the springs 66 in yieldingly biasing the holder 60 and thus the seal face member 70 into frictional engagement with the seal face member 38. Accordingly, greater fluid pressure within the associated pump serves to apply a greater hydraulic force to holder 60 in order to augment the thrust of the springs 66 in urging the holder 60 and thus the seal face member 70 into frictional engagement with the seal face member 38. A clip assembly 74, 76 is provided for presetting the spring and seal interface compression for use on a one-piece cartridge assembly.

In operation, the springs 66 and hydraulic pressure acting upon the recess 72 serve to yieldingly bias the holder 60 and thus the seal face member 70 into frictional engagement with seal face member 38. The contact between the seal face member 38 and the wall 36 opposes the spring and hydraulic pressure acting upon the holder 66 and the tight O-ring 40 serves to radially position the seal face member 38 in the cavity 30. This, in conjunction with the radial positioning of the holder 60 and seal face member 70 by the O-ring 54 insures a continuous seal between the seal face members 38 and 70, even if the shaft 12 is not properly aligned relative to the associated housing.

Figure 2:
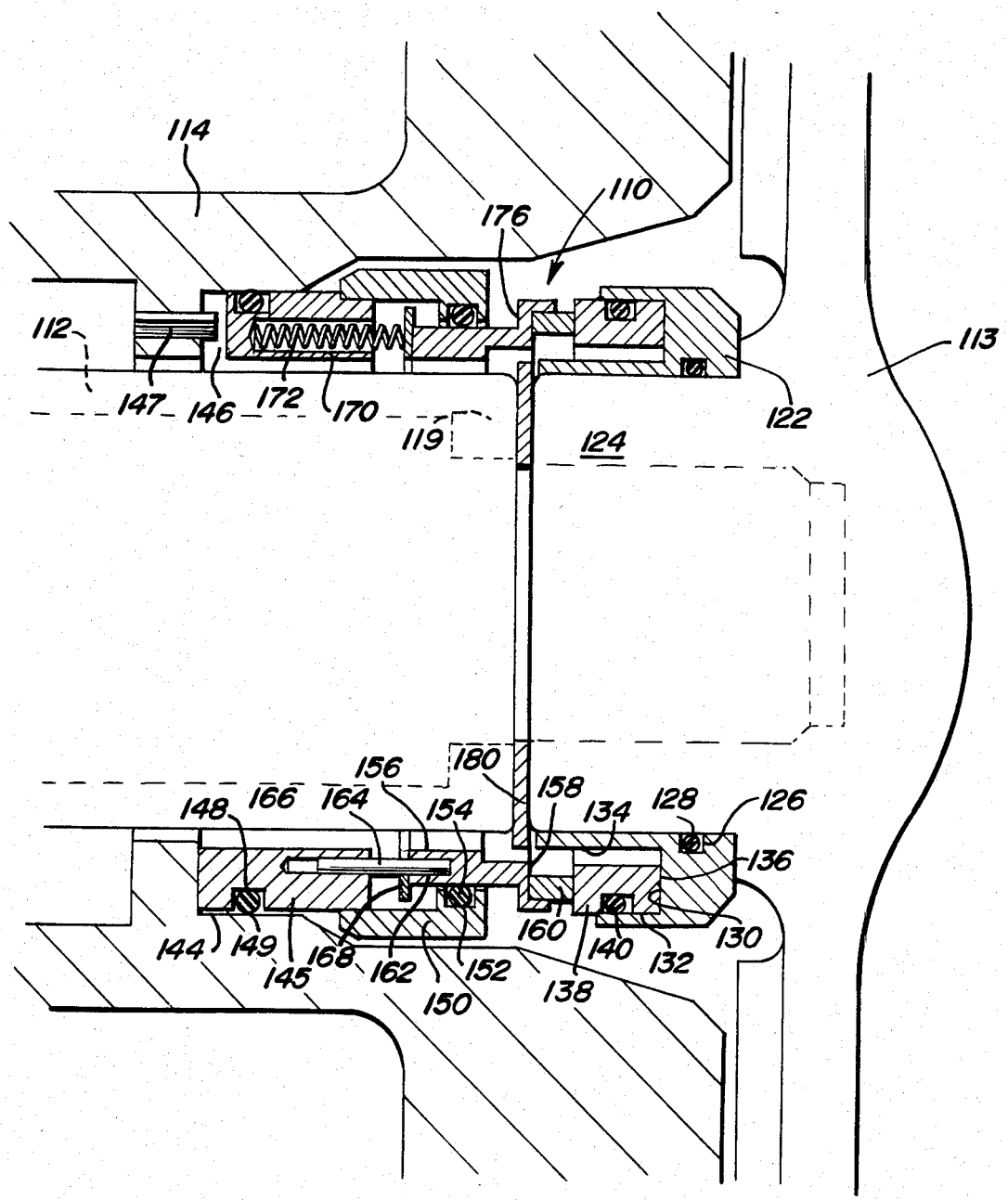
FIG. 2 is a vertical sectional view taken substantially upon a plane passing through the center of a second form of seal assembly constructed in accordance with the present invention.

With reference now more specifically to FIG. 2, the second form of bearing assembly referred to in general by the reference numeral 110. The bearing assembly 110 is used between a shaft 112 having an impeller 113 mounted thereon and rotatable relative to a housing 114.

The bearing assembly 114 includes a holder or housing 122 snugly slipped over the cylindrical mounting boss 124 of the impeller 113. The holder 122 includes an inner circumferential groove 126 in which a driving O-ring 128 is seated, the O-ring 128 being frictionally engaged with the mounting boss 124 for driving the holder 122 from the impeller 113. The holder 113 defines an axially opening annular cavity 130 including outer and inner cylindrical walls 132 and 134 as well as an inner end wall 136. A seal face member 138 is seated within the cavity 132 against the end wall 136 and is radially positioned within the cavity 132 by an O-ring 140.

The housing 114 defines a counterbore 144 in which an annular carrier 145 equipped with circumferentially spaced radial inner end slots is seated, the housing 114 including circumferentially spaced drive pins 147 spaced about counterbore 144 and including projecting ends received in the slots 146 whereby the carrier 145 is keyed against rotation relative to the housing 114. In addition, the holder 145 includes a circumferential outwardly opening groove 148 in which an O-ring 149 is seated, the O-ing 149 forming a seal between the carrier 145 and counterbore 144 and also serving to radially position the carrier 145 in the counterbore 144.

The carrier 144 includes a diametrically enlarged portion 150 equipped with an inner circumferential and radially inwardly opening groove 152 in which an O-ring 154 is seated and an annular holder 156 is provided and defines a counterbore 158 in which an annular seal face member 160 is mounted. The holder 156 includes circumferentially spaced axially extending blind bores 162 in which corresponding ends of circumferentially spaced pins 164 are pressed and the other set of corresponding ends of the pins 164 are slidable in axially circumferentially spaced bores 166 formed in the carrier 145. The pins 164 are interconnected by an annular ring 168 which abuts against the axial end of the holder 156 remote from the seal face member 160.

It is also pointed out that the carrier 145 includes circumferentially spaced axially extending blind bores 170 in which one set of corresponding ends of a plurality of compression springs 172 are seated, the other set of corresponding ends of the compression springs 170 abutting against the ring 168 to yieldingly bias the ring and thus the holder 156 and seal face member 160 toward the right as viewed in FIG. 2 of the drawings with the face of the seal face member 160 frictionally engaged with the opposing face of the seal face member 138.

It is also to be noted that the holder 156 includes a relieved portion 176 with which fluid under pressure within the associated pump is communicated and this fluid pressure acts upon the relieved portion 176 to augment the springs 172 in yieldingly biasing the holder 156 and thus the seal face member 162 to the right as viewed in FIG. 2 whereby a frictional engagement between the seal member 160 and the seal face member 138 is assured.

Figure 3:
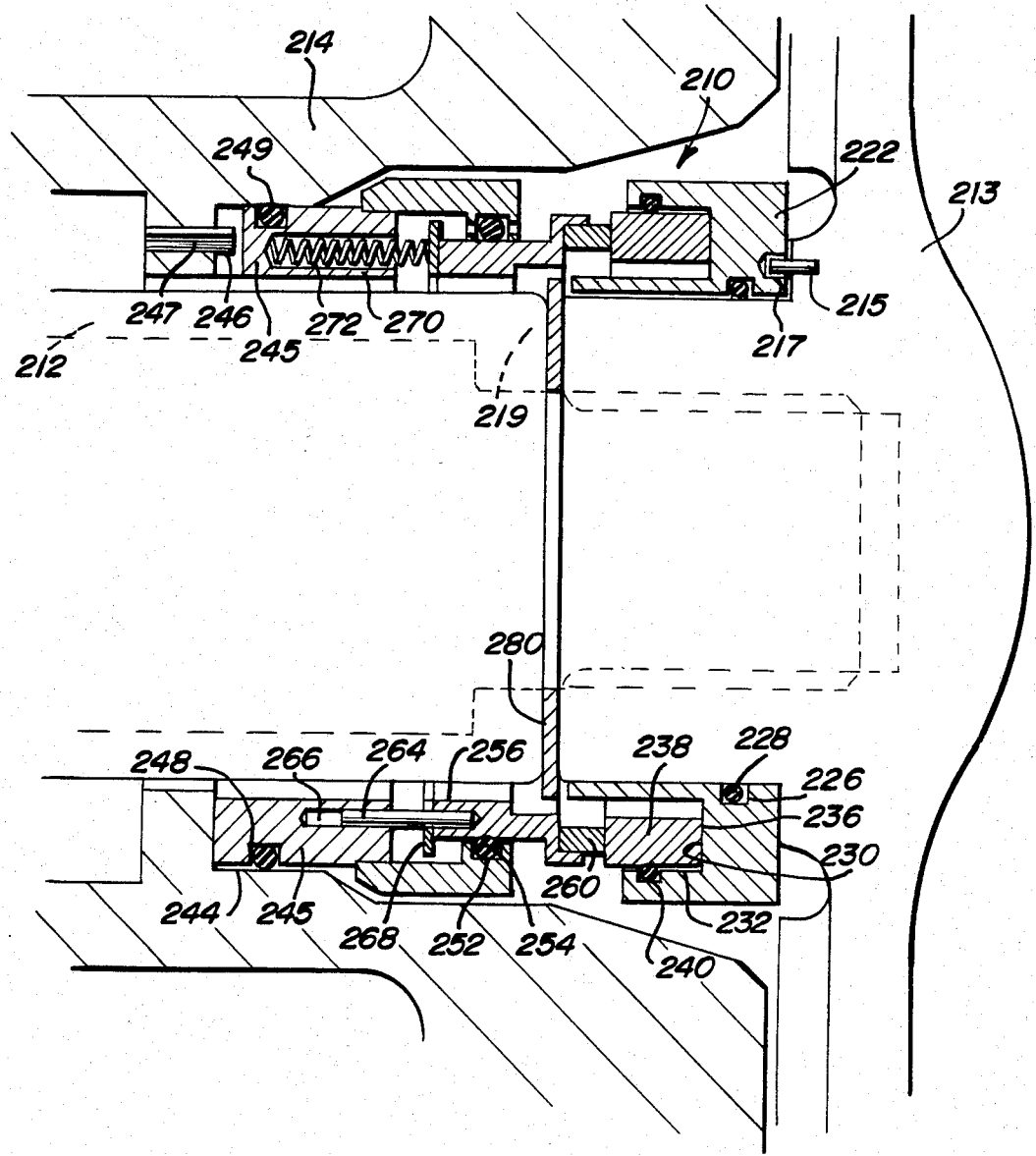
FIG. 3 is a vertical sectional view taken substantially upon a plane passing through the longitudinal center of a third form of bearing assembly of the instant invention.

The attention now invited more specifically to FIG. 3 of the drawings, a third form of seal assembly 210 is illustrated. The seal assembly 210 is substantially identical to the seal assembly 110 and, accordingly, has its components corresponding to the various components of the seal assembly 110 indicated by reference numerals in the 200 series corresponding to the 110 series of references applied to the various components of the seal assembly 110.

The seal assembly 210 differs from the seal assembly 110 in that the impeller 213 is equipped with circumferentially spaced pins 215 which are received in axially extending circumferentially spaced bores 217 formed in the holder or housing 222 corresponding to the holder or housing 122. Otherwise, the seal assembly 210 is substantially identical to the seal assembly 110. It is also pointed out that the seal assembly 110 and 210 include retaining rings 180 and 280 interposed between the impellers 113 and 213 and the opposing shoulders 119 and 219 of the shafts 112 and 212. Fluid pressure within the associated housings 114 and 214 act upon the ends of the holders or housings 122 and 222 and serve to yieldingly bias the housings 122 and 222 toward the left as viewed in FIGS. 2 and 3 of the drawings during operation of the associated pumps until the holders 122 and 222 abut the retaining rings 180 and 280.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a stationary housing portion defining an opening therethrough and a shaft rotatable relative to said housing portion and projecting loosely through said opening, a seal assembly including an elongated sleeve slidably and rotatably mounted on said shaft and including first and second ends disposed on first and second sides of said housing portion, said first end of said sleeve defining a seal cavity concentric with said sleeve and opening axially along said sleeve toward said second sleeve end, a first annular seal stationarily mounted in said cavity with one axial face of said seal facing towards said second sleeve end and disposed normal to the axis of rotation of said shaft, first seal means establishing a fluid tight seal between said first sleeve end and said shaft, second seal means establishing a fluid tight seal between said sleeve and said seal, said housing portion defining an annular recess concentric with said shaft and opening axially thereof toward said first sleeve end, an annular seal holder loosely received in said cavity for radial as well as axial shifting therein, a second annual seal mounted from said holder and facing toward and abutting said first annular seal, means establishing a guiding connection between said annular seal holder and said housing portion keying said holder to said housing portions against rotation relative to said housing portion about the axis of rotation of said shaft while allowing axial shifting of said holder relative to said housing portion, sleeve and shaft, circumferentially spaced spring means yieldingly biasing said holder relative to said housing portion toward said first end of said sleeve, and means operative to key said sleeve to said shaft for rotation therewith and in adjusted axially shifted position on said shaft relative to said housing portion.

2. The combination of claim 1 wherein said cavity includes concentric cylindrical inner and outer walls, said second seal means comprises annular seal means interposed between one of said cylindrical walls and opposing portions of said first annular seal.

3. In combination with a stationary housing portion defining an opening therethrough and a shaft rotatable relative to said housing portion and projecting loosely through said opening, a seal assembly including an elongated sleeve slidably and rotatably mounted on said shaft and including first and second ends disposed on first and second sides of said housing portion, said first end of said sleeve defining a seal cavity concentric with said sleeve and opening axially along said sleeve toward said second sleeve end, a first annular seal stationarily mounted in said cavity with one axial face of said seal facing towards said second sleeve end and disposed normal to the axis of rotation of said shaft, first seal means establishing a fluid tight seal between said first sleeve end and said shaft, second seal means establishing a fluid tight seal between said sleeve and said first annular seal, said housing portion defining an annular recess concentric with said shaft and opening axially therealong toward said first sleeve end, an annular seal holder loosely received in said cavity for radial as well as axial shifting therein, a second annular seal mounted from said holder and facing toward and abutting said first annular seal, circumferentially spaced axial guide pin means extending between and establishing a guiding connection between said annular seal holder and said housing portion keying said holder to said housing portion against rotation relative to said housing portion about the axis of rotation of said shaft while allowing axial shifting of said holder relative to said housing portion and shaft, circumferentially spaced spring means spaced between circumferentially adjacent guide pin means yieldingly biasing said holder relative to said housing portion toward said first end of said sleeve, third seal means establishing a fluid tight seal between said holder and said housing portion, and means operative to key said sleeve to said shaft for rotation therewith in adjusted axially shifted position on said shaft relative to said housing portion.

* * * * *